(12) United States Patent
Silva et al.

(10) Patent No.: US 11,144,886 B2
(45) Date of Patent: Oct. 12, 2021

(54) ELECTRONIC MEETING TIME OF ARRIVAL ESTIMATION

(71) Applicant: INTERNATIONAL BUSINESS MACHINES CORPORATION, Armonk, NY (US)

(72) Inventors: Asima Silva, Holden, MA (US); Richard Gorzela, Billerica, MA (US); Jaime M. Stockton, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 761 days.

(21) Appl. No.: 15/851,429

(22) Filed: Dec. 21, 2017

(65) Prior Publication Data

US 2019/0197490 A1 Jun. 27, 2019

(51) Int. Cl.
G06Q 10/10 (2012.01)
G06F 16/33 (2019.01)
G06F 16/242 (2019.01)

(52) U.S. Cl.
CPC ..... *G06Q 10/1095* (2013.01); *G06F 16/3344* (2019.01); *G06F 16/243* (2019.01)

(58) Field of Classification Search
CPC ............ G06Q 10/1095; G06Q 10/109; G06Q 10/1093; G06Q 10/063116; G06Q 10/063114
USPC ...................................................... 705/7.19
See application file for complete search history.

(56) References Cited

U.S. PATENT DOCUMENTS

| | | | |
|---|---|---|---|
| 6,219,415 B1 | 4/2001 | Deutsch | |
| 6,757,260 B2 | 6/2004 | Pandit | |
| 7,136,458 B1 | 11/2006 | Zellner | |
| 8,107,596 B1 | 1/2012 | Gentle | |
| 8,527,287 B1 | 9/2013 | Bhatia | |
| 8,743,171 B2 | 6/2014 | Hiller | |
| 9,111,263 B2 | 8/2015 | Li | |
| 9,269,092 B2 | 2/2016 | Dyer | |
| 9,635,061 B2 | 4/2017 | McCormack | |
| 10,250,749 B1 * | 4/2019 | Boone | H04M 3/5231 |
| 2003/0004776 A1 * | 1/2003 | Perrella | G06Q 10/063116 705/7.19 |
| 2003/0014491 A1 | 1/2003 | Horvitz | |
| 2003/0046304 A1 * | 3/2003 | Peskin | G06Q 10/109 |
| 2003/0125954 A1 | 7/2003 | Bradley | |
| 2003/0231746 A1 | 12/2003 | Hunter | |

(Continued)

FOREIGN PATENT DOCUMENTS

JP 2009277013 A 11/2009

OTHER PUBLICATIONS

IBM: List of IBM Patents or Patent Applications Treated as Related, 2 pg.

(Continued)

*Primary Examiner* — Johnna R Loftis
(74) *Attorney, Agent, or Firm* — Fabian VanCott Steven Nichols

(57) ABSTRACT

Electronic meeting time of arrival estimation is described. A number of attendees to an electronic meeting are identified. Based on an indication that a first attendee is in another electronic meeting, an estimated time of arrival for that first attendee to the electronic meeting is determined. Other attendees to the electronic meeting are provided with the estimated time of arrival of the first attendee.

14 Claims, 6 Drawing Sheets

(56) References Cited

U.S. PATENT DOCUMENTS

| | | | |
|---|---|---|---|
| 2004/0003042 A1 | 1/2004 | Horvitz | |
| 2004/0136515 A1 | 12/2004 | Litwin | |
| 2006/0224430 A1 | 10/2006 | Butt | |
| 2007/0112926 A1 | 5/2007 | Brett | |
| 2007/0118415 A1* | 5/2007 | Chen | G06Q 10/02 |
| | | | 705/5 |
| 2008/0040187 A1 | 2/2008 | Carraher | |
| 2008/0171559 A1* | 7/2008 | Frank | H04W 4/029 |
| | | | 455/456.5 |
| 2009/0172120 A1 | 7/2009 | Ruelas | |
| 2009/0271438 A1 | 10/2009 | Agapi | |
| 2010/0228577 A1* | 9/2010 | Cunningham | G06Q 10/02 |
| | | | 705/5 |
| 2011/0072362 A1 | 3/2011 | Srikanth | |
| 2011/0075829 A1 | 3/2011 | Goldman | |
| 2011/0252097 A1* | 10/2011 | Walker | G06Q 10/06 |
| | | | 709/206 |
| 2011/0257881 A1* | 10/2011 | Chen | G01C 21/362 |
| | | | 701/465 |
| 2012/0011205 A1 | 1/2012 | Paulsami | |
| 2012/0173135 A1* | 7/2012 | Gutman | G01C 21/3469 |
| | | | 701/408 |
| 2012/0185534 A1* | 7/2012 | Zimmet | G06Q 10/109 |
| | | | 709/204 |
| 2013/0038673 A1 | 2/2013 | Hiller | |
| 2014/0108085 A1 | 4/2014 | Henriksen | |
| 2014/0164510 A1 | 6/2014 | Abueisaad | |
| 2014/0289326 A1* | 9/2014 | McCormack | H04L 65/1093 |
| | | | 709/204 |
| 2015/0302363 A1 | 10/2015 | Wang | |
| 2017/0061389 A1* | 3/2017 | Naughton | G06Q 10/1095 |
| 2017/0308866 A1 | 10/2017 | Dotan-Cohen | |
| 2017/0310716 A1* | 10/2017 | Lopez Venegas | |
| | | | G06Q 10/1093 |
| 2017/0316385 A1 | 11/2017 | Joshi | |
| 2018/0283896 A1* | 10/2018 | Piemonte | G01C 21/3664 |

OTHER PUBLICATIONS

"Best Meeting Software / 2016 Reviews of the Most Popular Systems"; (Online) Capterra, The Smart Way to Find Business Software (retrieved Oct. 30, 2016) from the internet <http://www.capterra.com/meeting-software/>, 22 pages.

* cited by examiner

ELECTRONIC MEETING TIME OF ARRIVAL ESTIMATION

BACKGROUND

The present invention relates to electronic meeting management, and more specifically to the estimation of a time of arrival of certain attendees to the electronic meeting. During an electronic meeting, multiple attendees engage in a discussion using a conferencing system such as a teleconferencing system or a computing conference system. Often times the users are in different geographical locations. Such conferencing systems are becoming more and more frequently used as business endeavors are becoming less and less dependent upon geographical proximity.

SUMMARY

According to an embodiment of the present invention, a computer-implemented method for estimating a time of arrival of an attendee to an electronic meeting is described. According to the method, a number of attendees to the electronic meeting are identified. Based on an indication that a first attendee of the number of attendees is in another electronic meeting, an estimated time of arrival of that first attendee to the electronic meeting is determined. Other attendees to the electronic meeting are provided the estimated time of arrival of the first attendee.

The present specification also describes a system. The system includes a database comprising user meeting history information. A scheduler of the system identifies 1) a number of attendees to an electronic meeting and 2) a meeting schedule for each of the number of attendees. A meeting manager of the system determines whether each of the number of attendees is in another electronic meeting and an estimator estimates, based on an indication that a first attendee is in another electronic meeting, a time of arrival of the first attendee to the electronic meeting. An interface of the system provides the estimated time of arrival of the first attendee to other attendees to the electronic meeting.

The present specification also describes a computer program product. The computer program product includes a computer readable storage medium having program instructions embodied therewith. The program instructions are executable by a processor to cause the processor to identify a number of attendees to an active electronic meeting. The program instructions are also executable by the processor to cause the processor to determine whether a first attendee is in another electronic meeting. Based on an indication that the first attendee is in another electronic meeting, the program instructions are executable by the processor to cause the processor to determine an estimated time of arrival of the first attendee to the electronic meeting based on 1) a meeting type of the other electronic meeting, 2) natural language analysis of the other electronic meeting, 3) a meeting history for the first attendee, and 4) a geographic location of the first attendee. The program instructions are also executable by the processor to cause the processor to provide the estimated time of arrival of the first attendee to other attendees to the electronic meeting.

DETAILED DESCRIPTION

Figure 1:
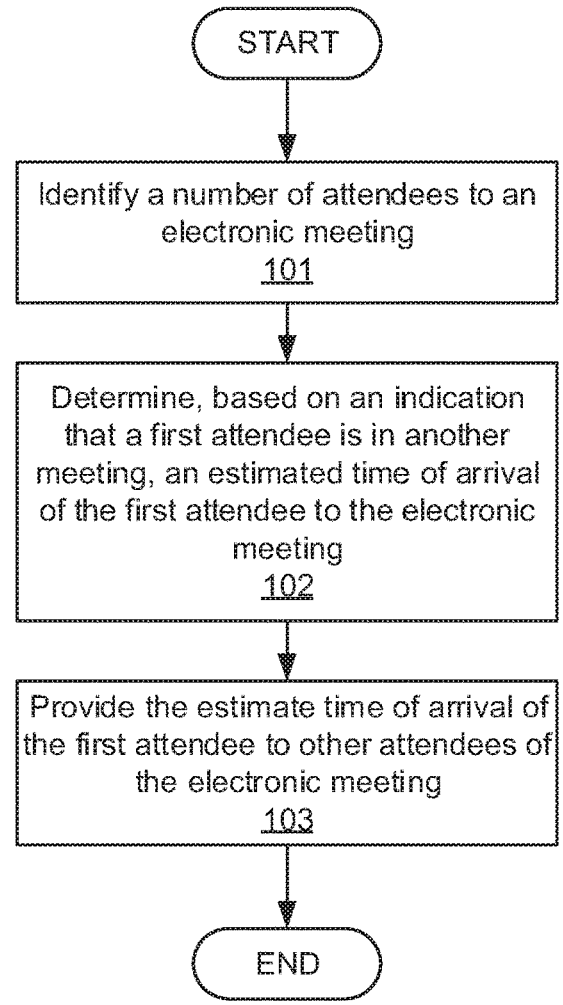
FIG. 1 depicts a flowchart of a method for electronic meeting time of arrival estimation, according to an example of principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, electronic meeting systems such as teleconferencing systems and video conferencing systems have become a relevant form of modern-day correspondence, in particular in the business setting. For example, business organizations use conferencing systems such as teleconferencing systems, web conferencing systems, online conferencing systems and/or video conferencing systems to provide additional means of communication. However, such technology has not kept pace with the modern trend of increasing efficiency. For example, work-hours are lost as individuals enter into an electronic meeting yet have to wait for certain attendees to arrive, sometimes without knowing how long they will have to wait, or if the meeting is even still anticipated. During the period of time they are waiting, those attendees who are waiting could be performing other tasks. Moreover, waiting for an electronic meeting to begin can be annoying, especially as those who are waiting do not know how long they will have to wait, or if a scheduled electronic meeting is likely to be cancelled. This irritation can lead to bad feelings and an unproductive meeting when, or if, all of the delayed attendees do eventually join the meeting. While a user can send an instant message or text to the delayed attendees to see if, and when, they will be joining, the attendee that is late to the meeting may not respond, and the person may be reluctant to send the text to avoid communicating a sentiment of improper impatience.

Accordingly, the present specification describes an electronic meeting on-hold system that monitors the attendees' prior electronic meetings to determine if they are in another electronic meeting. If an attendee is in another electronic meeting, the system determines whether the other electronic meeting is wrapping up. The system can also monitor the attendee's location to determine how far away they are from a location where they will engage in the meeting and if they are in transit. The system can also learn how much the attendee's meetings on average exceed an allotted time. Using this information the system lets the on-hold attendees know a time when the attendee is likely to dial into the current electronic meeting.

In some examples, the system can learn how late the attendee waits before rescheduling the electronic meeting, cancelling the electronic meeting, or simply indicating that they won't be attending the electronic meeting. The system can then notify the on-hold attendees accordingly.

In any of these examples, the notifications of an estimated time of arrival and/or a status of the delayed attendee/electronic meeting may be provided in any number of ways. For example, depending on user preference, the notifications can be announced verbally by the system or as an audible queue that has increased beat or intensity that coincides with the estimate of the call start time. In summary, the present specification intelligently monitors conference conversations and attendees locations to estimate when the attendees' prior calls appear to be wrapping up, and then notifies the on-hold attendees of the status and estimated arrival time of the delayed attendee.

In summary, such a system and method 1) provide notifications to on-hold attendees to enhance electronic meeting efficiency; 2) provide a status of the delayed attendee; and 3) provide estimates as to likely actions, i.e., cancel, reschedule, or absence, based on user call history for the delayed participant. However, it is contemplated that the devices disclosed herein may address other matters and deficiencies in a number of technical areas.

As used in the present specification and in the appended claims, the term "a number of" or similar language is meant to be understood broadly as any positive number including 1 to infinity.

Further, as used in the present specification and in the appended claims, the term "electronic meeting" refers to a variety of types of electronic meetings. For example, an electronic meeting may be a telephonic conference call or an electronic meeting on a computing system. Electronic meetings on computing systems may be referred to as video conferences, online conferences, and web conferences, among others.

Turning now to the figures, FIG. 1 depicts a flowchart of a method (100) for electronic meeting time of arrival estimation, according to an example of principles described herein. According to the method (100), a number of attendees to an electronic meeting are identified (block 101). As described above, an electronic meeting refers to a conference meeting, be it telephonic or on a computer, wherein multiple individuals participate from potentially different geographical locations. For example, users in different locations within an office building or users in different locations in a country, or across the globe, can participate in a single electronic meeting. The identification (block 101) of these attendees can be done by various means. For example, when setting up an electronic meeting, a list of invitees may be generated, from which the list of attendees are identified. In this example, selection of invitees may be from a database that includes a list of potential invitees within an organization.

The attendees to an electronic meeting may be identified (block 101) based on a calling number. That is, a conferencing system may recognize a number that is dialing in to the call and may associate, via a database, a particular individual with that calling number. In another example, the system may identify (block 101) attendees based on voice recognition. That is, as a user enters an electronic meeting they may be specifically asked to recite their name. From this name indication, the system identifies the attendee. In another example, the system can simply record an audio signature spoken by the person during the course of the meeting, and compare this audio signature to a database of audio signatures to identify the speaker and thus identify (block 101) the attendee. In yet another example, a system can determine, based on profile information or metadata on a computing device, the attendees to the electronic meeting.

According to the method (100), it may be determined whether a particular attendee is in another meeting. For example, a moderator of the scheduled electronic meeting may be on another telephone conference call. Based on a first attendee being in another meeting, the system determines (block 102) an estimated time arrival of the first attendee to the electronic meeting. For example, a meeting management system may be tied in with an enterprise system and can determine which of its users are actively in another electronic meeting. The meeting management system may correspond with a scheduling system to determine that the electronic meeting the first attendee is on is a scheduled meeting. For example, the meeting management system establishes communications with a scheduling system and extracts therefrom data regarding a schedule for the first attendee. The schedule is then compared against a current time to determine if the first attendee is still in that electronic meeting. While the present specification describes a meeting management system within an enterprise environment, such a meeting management system may be present in other environments, such as a mobile device environment.

The system can then determine (block 102) an estimate of a time of arrival for this first attendee. Such an estimate can be based on any number of factors. For example, the estimate may be based on an average amount of time the first attendee's meetings exceed their allotted time. Other examples include a natural language analysis of the electronic meeting to determine if the previous electronic meeting is wrapping up. Yet another example is based on a geographic location of the user.

With this information on hand, the system can provide (block 103) the estimate of the time of arrival of the first attendee to other attendees of the electronic meeting. This provision can occur in a variety of fashions. For example, a verbal indication can be provided. In other examples other auditory or other sensory notification is provided. In some examples, the auditory indication may be related to the estimate. For example, as the estimated time of arrival draws nearer, the auditory notification may change, for example, as an increase in intensity. For example, depending on user preference, the notification may be an audible queue that has an increased beat or intensity, such as an increase in voice chatter heard before a theatric show, or additional instrumentation as in the case of the buildup to a symphonic performance, which coincides with the approach of the estimated time of arrival.

A specific example is now provided. In this example two participants may be attendees to a particular electronic meeting and are placed on hold upon entering until a third participant joins. In this example, the system has been continuously monitoring the third participant's previous meeting and 1) identifies that the third participant is in a meeting and 2) indicates that the previous electronic meeting is near termination. The system thereby notifies the first two participants of the status of the third participant as well as indicating an estimated time of arrival of the third participant, i.e., a starting time for the electronic meeting. In some examples, the system may determine a geographic location of the third participant, as well as movement of the third participant, i.e., that he is not as his desk and is headed towards the conference room. Accordingly, the system may account for this geographic location and movement and use it in providing, or updating, the estimated time of arrival of the third participant.

Accordingly, in this example, the method (100) determines 1) that a first attendee will be late to an electronic meeting, 2) determines when it is likely that the first attendee will enter the electronic meeting, and 3) provides a notification to other attendees of the potential delay and estimated time of arrival for that attendee. In some examples, the electronic meeting is a current electronic meeting. In this example, the other attendees may be on-hold attendees. In another example, the electronic meeting may be a future electronic meeting, and the attendees have not yet entered. In this example, the notification may be made to other attendees who have not yet entered and may thus allow them to avoid entering until closer to the estimated time of arrival of the first attendee thus further providing greater efficacy to the electronic meeting scheduling system. Still further, in some examples, the first attendee may be a moderator of the electronic meeting. In other examples, the first attendee may be a mere participant, i.e., and not moderator, of the electronic meeting.

Figure 2:
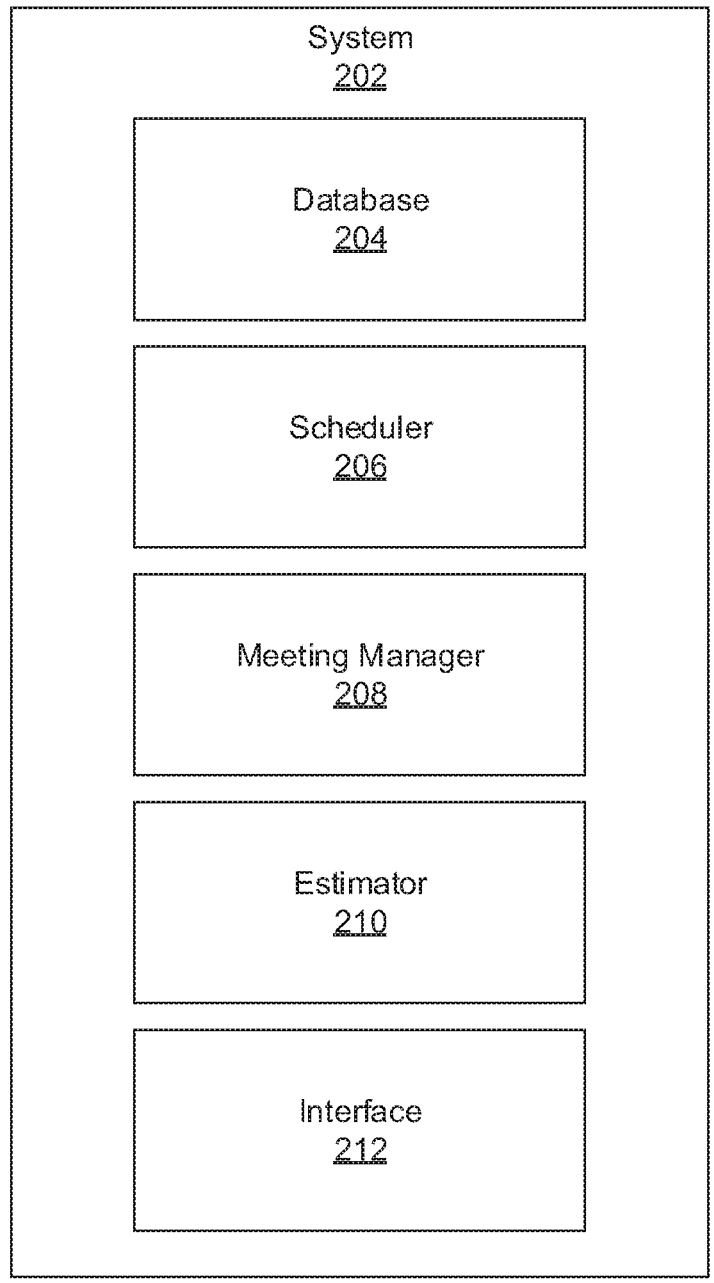
FIG. 2 depicts a system for electronic meeting time of arrival estimation, according to an example of the principles described herein.

FIG. 2 depicts a system (202) for electronic meeting time of arrival estimation, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The system (202) includes a database (204). The database (204) stores user meeting history information. The user meeting history information includes information related to electronic meeting characteristics, or other user behavior characteristics for a particular user. For example, user meeting history information may indicate how long electronic meetings that include a particular user generally exceed allotted times. This piece of information can be determined by comparing the scheduled time for an electronic meeting with information from a communications unit that indicates an actual time stamp to determine how much longer the time stamp is than the scheduled time for the electronic meeting.

The user meeting history information may also include information related to the types of electronic meeting. For example different types of electronic meeting may refer to the different groups participating in a particular electronic meeting. One example of a type of electronic meeting is a management meeting where a manager may be conferencing with other managers. Another example of a type of electronic meeting is a product development meeting where a manager is talking with the product development team that he manages regarding a particular product. In other words, the indication of how long electronic meeting that include a particular user generally exceed allotted times may be grouped based on a type of meeting. In this example, the system (202) processes metadata associated with the scheduler (206), for example data fields, to determine a type of meeting. In another example, a type of meeting may be determined by first determining the invitees to the meeting based on information extracted from the scheduler (206) and then identifying organizational roles based on profile information contained in the database (204).

The user meeting history information may also include results of a natural language analyzer. For example, a natural language analyzer may detect, and flag, certain phrases such as "okay, in summary" that a user uses near the end of an electronic meeting. In this example, the natural language analyzer extracts vocal language, or typed language, and determines if that language contains any of the aforementioned trigger phrases. If such trigger phrases are present, the natural language analyzer can determine the status of the meeting. The information in the database (204) may be collected for a number of attendees, and may be used by the system (202), in part, to determine an estimation for the arrival time of a particular attendee who is late for an upcoming, or active, electronic meeting.

The system (202) also includes a scheduler (206). The scheduler (206) can identify a number of attendees to an electronic meeting. For example, via the scheduler (206) a moderator or other individual can create an electronic meeting event which can be distributed by, and accepted or rejected by, a number of attendees. The scheduler (206) can identify those individuals who have received, and accepted a meeting request. Upon acceptance, the scheduler (206) inserts data into a meeting file that indicates attendees to that meeting. The scheduler (206) may also identify a meeting schedule for each of the number of attendees by extracting individual schedule files for each of multiple users of a network. That is, in addition to the electronic meetings a user may have scheduled, the scheduler (206) via a user interface, may be aware of other meetings that a user has scheduled. In this example, the scheduler (206) may include information relating to each meeting that is scheduled, and each individual within a networked organization.

A meeting manager (208) of the system (202) collects information from the electronic meeting of the users. For example, an enterprise phone system may be able to detect whether a phone on the enterprise network is active, i.e., on a call or inactive, i.e., not on a call, without recording, or being cognizant of the specifics of the conversation. That is, when active, an enterprise phone system outputs a signal, which can be used by the meeting manager (208) to determine whether a user is on a phone call. For example, such a signal could indicate that a user is using a phone system. The meeting manager (208) could also extract information from the schedule files for the individual to determine they are on a scheduled call. Similar information could be gathered regarding other electronic meetings. This information can be passed to the database (204) to build user meeting history files for each individual and can also be sued by the estimator (210) to determine whether an estimation of arrival time is needed. Such a meeting managing system may be part of the enterprise network that includes communication systems as well as other electronic devices.

An estimator (210) of the system (202) can then estimate a time of arrival of an attendee who is in another electronic meeting, and therefore is going to be late to a scheduled, or on-going electronic meeting. That is, via feedback from the meeting manager (208), database (204), and scheduler (206), the estimator (210) may be activated to estimate an arrival of the attendee. Specifically, the estimator (210) can extract schedule files for the delayed attendee from the scheduler (206) to determine the user is in another electronic meeting. Once determined that the user is on another meeting, the estimator (210) accesses the database (204) to extract information such as an average difference between scheduled meeting times and actual meeting durations as recorded by the communication application used. The estimator (210) based on this information, outputs an estimated time of arrival calculated from 1) the scheduled termination time from the scheduler (206) and the historic response times found in the database (204).

Such an estimate may be based on a number of factors including information indicated in the database (204) as well as the scheduler (206). For example, a current electronic meeting may be scheduled for 12:15. However, the scheduler (206) may indicate that an attendee is scheduled to be in a previous electronic meeting until 12:10, which happens to be a management meeting. Based on the user meeting history information in the database (204) it may be determined that the attendee, in management meetings, typically runs 15 minutes late. Accordingly, the estimator (210) may indicate that the estimated time of arrival for the attendee is 12:25.

In some examples, the system (202) also includes an interface (212) through which a notification is provided to other attendees of the estimate arrival time of the particular attendee. Such interface (212) may take a variety of forms including telephonic notification. For example, a voice, or other auditory notification may be provided through the phone system that the attendees are using to conduct the electronic meeting. Other examples of interfaces (212) include email, instant messaging, collaborative workgroups, or other forms of notification.

Thus, the present system (202) allows for the notification of attendees, such as on-hold attendees, of an estimated arrival time of other attendees. In so doing, those on-hold attendees at least are aware of the absence and are not left in the dark. Still further, those attendees could take the estimated time of arrival and complete other tasks.

Figure 3:
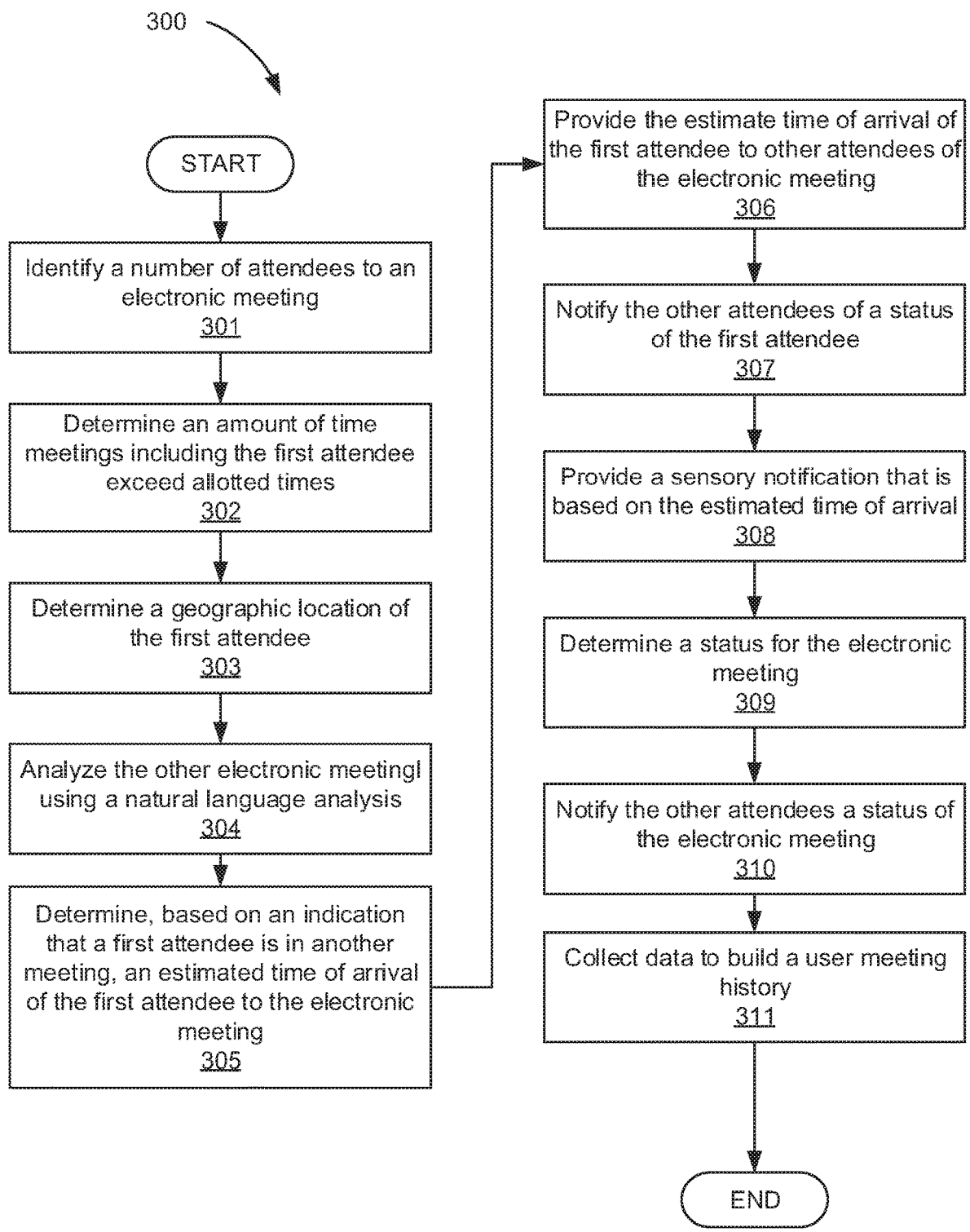
FIG. 3 depicts a flowchart of a method for electronic meeting time of arrival estimation, according to an example of principles described herein.

FIG. 3 depicts a flowchart of a method (300) for electronic meeting time of arrival estimation, according to an example of principles described herein. According to the method, a number of attendees to an electronic meeting is identified (block 301). This may be performed as described above in connection with FIG. 1.

Generally, an estimated time of arrival of a particular participant is estimated. This may be based on any number of factors. For example, the system may have access to a database that includes user meeting history information for the first attendee. The user meeting history information may include various pieces of information related to the first attendee, such as how long the first attendee's electronic meetings typically exceed an allotted time. For example, the database may indicate a start and stop time for scheduled electronic meeting for the first attendee and an actual time for such electronic meeting. From this information, the system can determine (block 302) an amount of time that electronic meeting in which the first attendee is a participant, generally exceed a corresponding allotted time. This estimated exceeding time may be based on a type of meeting. For example, the first attendee's management meetings may run longer over a scheduled time as compared to team meetings. Accordingly, determining (block 302) an amount of time that an electronic meeting exceeds its scheduled period may be based on a meeting type.

Another factor on which an estimated time of arrival may be based includes a geographic location of the first attendee. For example, a user may take conference and web calls from their home office or business office as these locations may provide the tools they need to comfortably and efficiently participate, i.e., a quite space, wireless connection, etc. In this example, the system (FIG. 2, 202) could learn over time, where a participant generally joins meetings from, and can check how far away a person is from that location. The system (FIG. 2, 202) can also estimate how long it will take the participant to reach the location. Such information could be gathered via a geo-locator of the system (FIG. 2, 202). A specific example is now provided.

In this example, it may be estimated that a user's previous electronic meeting was made while in a conference room and that the conference room is a 5 minute walk away from the users' desk. If it is determined that the first attendee's prior electronic meeting is approximately 5 minutes from terminating based on the user meeting history data in the database (FIG. 2, 204) a total estimated time of arrival may be 10 minutes from a particular point in time. Accordingly, in this example, the method (300) includes determining (block 303) a geographic location of the first attendee. Such information may be gathered from, for example an enterprise network that has information relating to nodes, i.e., computing devices of each computer within the network.

Yet another factor on which an estimated time of arrival may be based includes the semantics, or language used in the prior electronic meeting. For example, phrases such as "in summary" or "in conclusion," may be indicia that a meeting is close to ending. Accordingly, the system (FIG. 2, 202) may analyze (block 304) the prior electronic meeting using a natural language analysis to determine when a prior electronic meeting has ended, or is close to ending. That is, a natural language analyzer could listen for, and acknowledge these trigger phrases and base an estimation of the time of arrival for the first attendee, at least in part, on the natural language detected for the prior electronic meeting of the first attendee.

With this information on hand, the system (FIG. 2, 202) determines (block 305) an estimated time of arrival of the first attendee to the electronic meeting and provides (block 306) an estimate of this time of arrival of the first attendee to the other attendees on the electronic meeting. This may be performed as described above in connection with FIG. 1.

In some examples, in addition to providing (block 306) an estimate of the time of arrival of the first attendee, the system (FIG. 2, 202) may notify (block 307) the other attendees of a status of the first attendee. For example, if the scheduler (FIG. 2, 206) indicates that the first attendee is still scheduled to be in a management meeting, the system (FIG. 2, 202) may notify (block 307) the other users that the attendee is in a scheduled portion of the previous meeting, and in some cases may indicate that this management meeting, based on historical information in the user meeting history information, is likely to run long by 15 minutes. In another example, if the scheduler (FIG. 2, 206) indicates that the first user is outside of a scheduled period for a management meeting, but the meeting manager (FIG. 2, 208) indicates the user is still on the phone, the system (FIG. 2, 202) may notify the remaining attendees that the prior meeting has run long and that the first attendee is engaged in a long meeting. As yet another example, if based on an output from the meeting manager (FIG. 2, 208), the system (FIG. 2, 202) determines that the first attendee is no longer on the phone, the system (FIG. 2, 202) may notify the remaining attendees that the first attendee is in transit. This may also be based on the geographic information determined earlier.

In some examples, the system (FIG. 2, 202) provides (block 308) a sensory notification that is based on the estimated time of arrival. For example, as the estimated time of arrival changes, so does the sensory notification. For example, auditory indicia such as an orchestra prepping, or chatter before a movie, may grow in intensity as the estimated time of arrival draws nearer. In another example, the tempo, or beats per minute, may change as the estimated time of arrival draws near.

In some examples, the system (FIG. 2, 202) determines (block 309) a status of the electronic meeting. Examples of a status of the electronic meeting include cancelled, rescheduled, or a partially attended. For example, the database (FIG. 2, 204) may include information not only indicating how long attendees electronic meeting typically run over, but may also include actions taken by the attendees when electronic meetings run over time. For example, the first attendee may, on average, reschedule an electronic meeting for which he will be 10 minutes late and may cancel an electronic meeting for which he will be 15 minutes late. Accordingly, the system (FIG. 2, 202) after indicating that a particular attendee is going to be 10 minutes late, may determine (block 309) that the electronic meeting will likely be rescheduled. In another example, the system (FIG. 2, 202) after indicating a particular attendee is going to be 15 minutes late, may determine (block 309) that an electronic meeting is going to be cancelled. As yet another example, rather than rescheduling or cancelling a meeting, user meeting history information for a particular attendee may indicate that if a user is to be 10 minutes late for an electronic meeting, he will simply not attend. Accordingly, the system (FIG. 2, 202) may determine a user's status for that electronic meeting as absent. The system may then notify (block 310) the other attendees of the status. Accordingly, rather than waiting until the attendee arrives to let them know the electronic meeting has been rescheduled or cancelled, or not finding out at all, the other attendees can find out relatively quickly.

In some examples, the method (300) includes collecting (block 311) data to build a user meeting history file. For example, as described above, the user meeting history is used to estimate a time of arrival of a particular attendee and includes such information as an average amount of time an attendee's electronic meetings go over, in some cases differentiated based on meeting type. The user meeting history information may also include user actions responsive to an electronic meeting extending past its allotted time. For example, the user may, after a certain amount of time, elect to cancel an electronic meeting, reschedule an electronic meeting, or simply to indicate that they will not be attending the electronic meeting. Over time the system (FIG. 2, 202) may monitor a user's action in these regards and store such information to build the user meeting history file in the database (FIG. 2, 204). Such information may be collected for each individual connected to the electronic meeting system. Such individuals may be workers within an organization.

Figure 4:
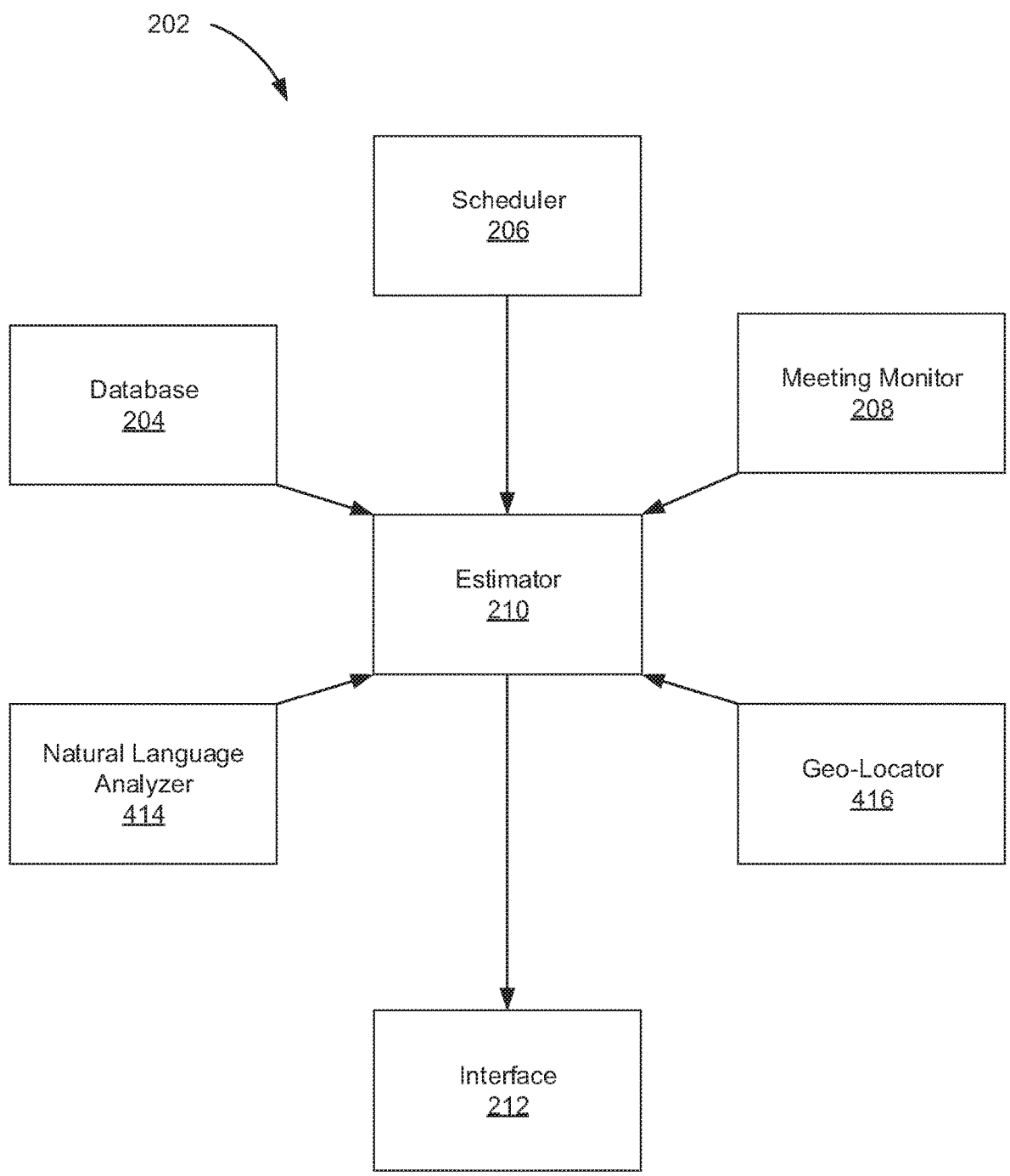
FIG. 4 depicts a system for electronic meeting time of arrival estimation, according to an example of the principles described herein.

FIG. 4 depicts a system (202) for electronic meeting time of arrival estimation, according to an example of the principles described herein. As described above, the system (202) may include a database (204), scheduler (206) and meeting manager (208), each of which contains information for multiple individuals including attendees to an electronic meeting. Information is sued by the estimator (210) to estimate a time of arrival when a particular attendee is going to be late for a scheduled electronic meeting. Via an interface (212), this information is provided via a notification to other attendees of the electronic meeting.

In some examples, the system (202) includes other components that provide addition information on which to base an estimated arrival time. For example, the system may include a geo-locator (416) that provides information regarding a geographic location of a user. For example, the geo-locator (416) may use an identifier address for an enterprise phone, which identifier is associated with a physical space within a building. In another example, the geo-locator may use positioning systems to identify the physical location of a user.

In another example, the system includes a natural language analyzer (414) to determine, based on the content of an electronic meeting, whether a particular electronic meeting is nearing completion. For example, the natural language analyzer (414) may be programmed to identify certain words of termination. In one example, the natural language analyzer (414) may be a machine-learning system that can 1) learn over time particular phrases used by specific attendees that indicate a meeting has ended, or is close to ending and 2) provide that information to the estimator (210) for estimation of an arrival time. In this example the natural language analyzer (414) may be able to detect user-specific phrases. For example, one user may frequently use the phrase "in summary" at the conclusion of electronic meetings and another may frequently utter the phrase, "sounds good" to indicate a call is coming to a close.

Figure 5:
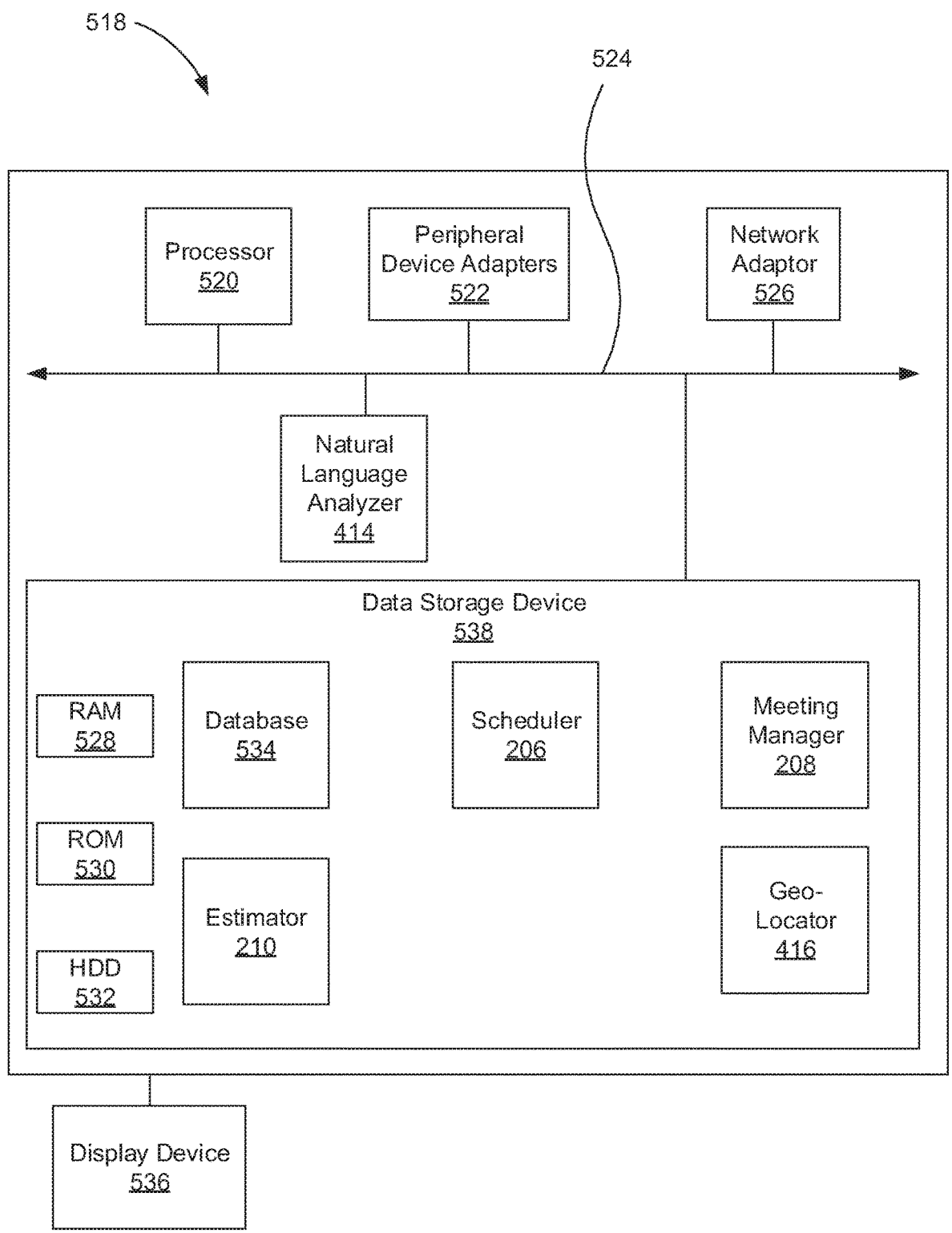
FIG. 5 is a diagram of a computing system for electronic meeting time of arrival estimation, according to an example of the principles described herein.

FIG. 5 is a diagram of a computing system (518) for electronic meeting time of arrival estimation, according to an example of the principles described herein. The computing device (518) may be implemented in an electronic device. Examples of electronic devices include servers, desktop computers, laptop computers, personal digital assistants (PDAs), mobile devices, smartphones, gaming systems, and tablets, among other electronic devices.

The computing device (518) may be utilized in any data processing scenario including, stand-alone hardware, mobile applications, through a computing network, or combinations thereof. Further, the computing device (518) may be used in a computing network, a public cloud network, a private cloud network, a hybrid cloud network, other forms of networks, or combinations thereof. In one example, the methods provided by the computing device (518) are provided as a service over a network by, for example, a third party.

To achieve its desired functionality, the computing device (518) includes various hardware components. Among these hardware components may be a number of processors (520), a number of data storage devices (538), a number of peripheral device adapters (522), and a number of network adapters (526). These hardware components may be interconnected through the use of a number of busses and/or network connections. In one example, the processor (520), data storage device (538), peripheral device adapters (522), and a network adapter (526) may be communicatively coupled via a bus (524).

The processor (520) may include the hardware architecture to retrieve executable code from the data storage device (538) and execute the executable code. The executable code may, when executed by the processor (520), cause the processor (520) to implement at least the functionality of estimating an electronic meeting arrival time. The functionality of the computing device (518) is in accordance to the methods of the present specification described herein. In the course of executing code, the processor (520) may receive input from and provide output to a number of the remaining hardware units.

The data storage device (538) may store data such as executable program code that is executed by the processor (520) or other processing device. As will be discussed, the data storage device (538) may specifically store computer code representing a number of applications that the processor (520) executes to implement at least the functionality described herein.

The data storage device (538) may include various types of memory modules, including volatile and nonvolatile memory. For example, the data storage device (538) of the present example includes Random Access Memory (RAM) (528), Read Only Memory (ROM) (530), and Hard Disk Drive (HDD) memory (532). Many other types of memory may also be utilized, and the present specification contemplates the use of many varying type(s) of memory in the data storage device (538) as may suit a particular application of the principles described herein. In certain examples, different types of memory in the data storage device (538) may be used for different data storage needs. For example, in certain examples the processor (520) may boot from Read Only Memory (ROM) (530), maintain nonvolatile storage in the Hard Disk Drive (HDD) memory (532), and execute program code stored in Random Access Memory (RAM) (528).

The data storage device (538) may include a computer readable medium, a computer readable storage medium, or a non-transitory computer readable medium, among others. For example, the data storage device (538) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (522, 526) in the computing device (518) enable the processor (520) to interface with various other hardware elements, external and internal to the computing device (518). For example, the peripheral device adapters (522) may provide an interface to input/output devices, such as, for example, display device (536), a mouse, or a keyboard. The peripheral device adapters (522) may also provide access to other external devices such as an external storage device, a number of network devices such as, for example, servers, switches, and routers, client devices, other types of computing devices, and combinations thereof.

The display device (536) may be provided to allow a user of the computing device (518) to interact with and implement the functionality of the computing device (518). The peripheral device adapters (522) may also create an interface between the processor (520) and the display device (536), a printer, or other media output devices. The network adapter (526) may provide an interface to other computing devices within, for example, a network, thereby enabling the transmission of data between the computing device (518) and other devices located within the network.

The computing device (518) may, when executed by the processor (520), display the number of graphical user interfaces (GUIs) on the display device (536) associated with the executable program code representing the number of applications stored on the data storage device (538). The GUIs may display, for example, interactive screenshots that allow a user to interact with the computing device (518) to input values in association with the memristive array (100) as will be described in more detail below. Additionally, via making a number of interactive gestures on the GUIs of the display device (536), a user may obtain a dot product value based on the input data. Examples of display devices (536) include a computer screen, a laptop screen, a mobile device screen, a personal digital assistant (PDA) screen, and a tablet screen, among other display devices (536).

The computing device (518) further includes a number of modules used in the implementation of the systems and methods described herein. The various modules within the computing device (518) include executable program code that may be executed separately. In this example, the various modules may be stored as separate computer program products. In another example, the various modules within the computing device (518) may be combined within a number of computer program products; each computer program product including a number of the modules.

The computing device (518) may include a database (534) to include user meeting history information. A scheduler (206) includes system-wide information related to electronic meeting schedules for individuals on the network. The meeting manager (208) collects information and statistics regarding electronic meeting characteristics. A geo-locator (416) determines a geographical location of a particular delayed attendee. An estimator (210) relies on any or all of this information to determine an estimated time of arrival of a particular attendee.

The computing device (518) also includes a natural language analyzer (414) which may be a hardware component that has a processing chip to determine whether a particular electronic meeting is close to termination.

Figure 6:
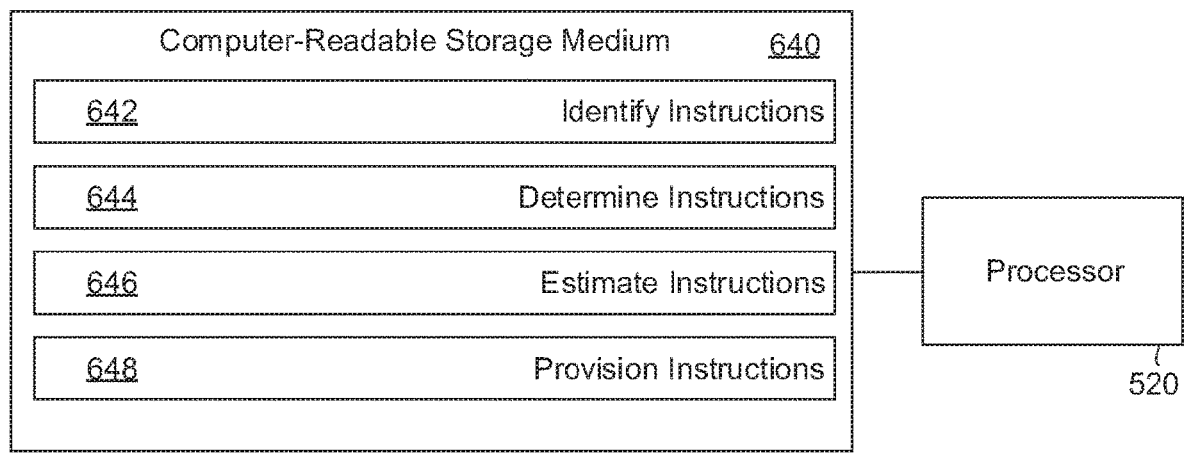
FIG. 6 depicts a computer readable storage medium for electronic meeting time of arrival estimation, according to an example of principles described herein.

FIG. 6 depicts a computer readable storage medium (640) for electronic meeting time of arrival estimation, according to an example of principles described herein. To achieve its desired functionality, a computing system includes various hardware components. Specifically, a computing system includes a processor (520) and a computer-readable storage medium (640). The computer-readable storage medium (640) is communicatively coupled to the processor (520). The computer-readable storage medium (640) includes a number of instructions (642, 644, 646, 648) for performing a designated function. The computer-readable storage medium (640) causes the processor (520) to execute the designated function of the instructions (642, 644, 646, 648).

Referring to FIG. 6, identify instructions (642), when executed by the processor (520), cause the processor (520) to identify a number of attendees to an active electronic meeting. Such identification can include identification via calling number, voice recognition, and profile information among others. The attendees may be notified of the presence of other attendees. Determine instructions (644), when executed by the processor (520), may cause the processor (520) to determine whether a first attendee is in another electronic meeting. Estimate instructions (646), when executed by the processor (520), may cause the processor (520) to, based on an indication that the first attendee is in another electronic meeting, determine an estimated time of arrival of the first attendee to the electronic meeting based on 1) a type of the other meeting, 2) natural language analysis of the other meeting, a meeting history for the first attendee, and a geographic location of the first attendee. Provision instructions (648), when executed by the processor (520), may cause the processor (520) to provide the estimated time of arrival of the first attendee to other attendees to the electronic meeting.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

In summary, such a system and method 1) provide notifications to on-hold attendees to enhance electronic meeting efficiency; 2) provide a status of the delayed attendee; and 3) provide estimates as to likely actions, i.e., cancel, reschedule, or absence, based on user meeting history for the delayed participant. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a number of attendees to an electronic meeting;
   determining whether a first attendee is currently in another electronic meeting using a phone system;
   based on an indication that the first attendee is in another electronic meeting, determining an estimated time of arrival of the first attendee to the electronic meeting by:
      determining a list of attendees in the other electronic meeting;
      extracting from a database, an indication of how long the first attendee meetings historically exceed scheduled times based on the list of attendees;
      extracting from the phone system, a time stamp for the other electronic meeting to determine how much longer the time stamp is than the scheduled time for the other electronic meeting; and
      determining the estimated time of arrival based on:
         the indication of how long the first attendee meetings historically exceed the scheduled times;
         a comparison of the time stamp with the scheduled time;
         a meeting type of the other electronic meeting;
         natural language analysis of the other electronic meeting;
         a meeting history for the first attendee; and
         a geographic location of the first attendee;
   providing the estimated time of arrival of the first attendee to other attendees to the electronic meeting via an auditory notification; and
   altering the auditory notification as the estimated time of arrival draws nearer.

2. The computer-implemented method of claim 1, further comprising, notifying the other attendees of a status of the first attendee.

3. The computer-implemented method of claim 1, further comprising:
   determining, based on user meeting history information, a status of the electronic meeting; and
   providing a notification to the other attendees of the status of the electronic meeting.

4. The computer-implemented method of claim 1, further comprising collecting data to build a user meeting history file for each attendee.

5. The computer-implemented method of claim 1, wherein the other attendees are on-hold attendees for an active electronic meeting.

6. The computer-implemented method of claim 1, wherein the electronic meeting is a future electronic meeting.

7. The computer-implemented method of claim 1, wherein the first attendee is a moderator of the electronic meeting.

8. The computer-implemented method of claim 1, wherein providing the estimated time of arrival of the first attendee to other attendees to the electronic meeting comprises providing a sound that increases in volume or frequency as the estimated time of arrival approaches.

9. A system comprising:
   a database comprising user meeting history information;
   a scheduler to:
      identify a number of attendees to an electronic meeting; and
      identify a meeting schedule for each of the number of attendees;
   a meeting manager to:
      determine, using a phone system, whether each of the number of attendees is in another electronic meeting;
      place the electronic meeting on hold until a first attendee, who is not initially present, joins the electronic meeting;
      reschedule the electronic meeting based on an estimated time of arrival for the first attendee being greater than a first threshold value; and
      cancel the electronic meeting based on the estimated time of arrival for the first attendee being greater than a second threshold value;
   an estimator to, based on an indication that the first attendee of the number of attendees is in another electronic meeting, estimate a time of arrival of the first attendee to the electronic meeting by:
      determining a list of attendees in the other electronic meeting;
      extracting from a database, an indication of how long the first attendee meetings historically exceed scheduled times based on the list of attendees;
      extracting from the phone system, a time stamp for the other electronic meeting to determine how much longer the time stamp is than the scheduled time for the other electronic meeting; and
      determining the estimated time of arrival based on:
         the indication of how long the first attendee meetings historically exceed the scheduled times; and
         a comparison of the time stamp with the scheduled time;
         a meeting type of the other electronic meeting;
         natural language analysis of the other electronic meeting;
         a meeting history for the first attendee; and
         a geographic location of the first attendee;
   an interface to:
      provide the estimated time of arrival of the first attendee to other attendees to the electronic meeting via; and
      alter the auditory notification as the estimated time of arrival draws nearer; and a natural language analyzer to, based on trigger words of the other electronic meeting, determine when the other electronic meeting is coming to a close.

10. The system of claim 9, wherein an output of the meeting manager activates the estimator.

11. A computer program product, the computer program product comprising a computer readable storage medium having program instructions embodied therewith, the program instructions executable by a processor to cause the processor to:
- identify a number of attendees to an active electronic meeting;
- determine, using a phone system, whether a first attendee is in another electronic meeting;
- based on an indication that the first attendee is in another electronic meeting, determine an estimated time of arrival of the first attendee to the electronic meeting by:
  - determining a list of attendees in the other electronic meeting;
  - extracting from a database, an indication of how long the first attendee meetings historically exceed scheduled times based on the list of attendees;
  - extracting from the phone system, a time stamp for the other electronic meeting to determine how much longer the time stamp is than the scheduled time for the other electronic meeting; and
  - determining the estimated time of arrival based on:
    - the indication of how long the first attendee meetings historically exceed the scheduled times; and
    - a comparison of the time stamp with the scheduled time;
  - a meeting type of the other electronic meeting;
  - natural language analysis of the other electronic meeting;
  - a meeting history for the first attendee; and
  - a geographic location of the first attendee;
- provide the estimated time of arrival of the first attendee to other attendees to the electronic meeting via an auditory notification; and
- alter the auditory notification as the estimated time of arrival draws nearer.

12. The computer program product of claim 11, further comprising program instructions executable by a processor to cause the processor to identify the number of other attendees via voice recognition.

13. The computer program product of claim 11, further comprising program instructions executable by a processor to cause the processor to identify the number of other attendees by a calling number.

14. The computer program product of claim 11, further comprising program instructions executable by a processor to cause the processor to notify the other attendees of one another.

* * * * *